United States Patent [19]
Flowers, Jr.

[11] Patent Number: 6,032,973
[45] Date of Patent: Mar. 7, 2000

[54] TRAILER HITCH WITH TELESCOPING GUIDE

[76] Inventor: Frank W. Flowers, Jr., 2515 Partridge Dr., Winter Haven, Fla. 33884

[21] Appl. No.: 09/022,410

[22] Filed: Feb. 12, 1998

[51] Int. Cl.[7] .................................................. B60D 1/00
[52] U.S. Cl. ........................................ 280/494; 280/478.1
[58] Field of Search ............................... 280/515, 478.1, 280/479.2, 479.3, 494, 493, 492

[56] References Cited

U.S. PATENT DOCUMENTS

| | | | |
|---|---|---|---|
| 4,245,714 | 1/1981 | Kersey | 180/265 |
| 4,589,672 | 5/1986 | Dickens | 280/479.2 |
| 5,975,552 | 11/1999 | Slaton | 280/478.1 |

FOREIGN PATENT DOCUMENTS 0 381 926 A2   1/1990   European Pat. Off. ............ 280/478.1

*Primary Examiner*—Kevin Hurley
*Assistant Examiner*—Andrew J. Ririe
*Attorney, Agent, or Firm*—Edmund M. Jaskiewicz

[57] ABSTRACT

A trailer hitch has both horizontal and vertical pivoting connections between a towing vehicle and a trailer and is further provided with a telescoping alignment bar to facilitate connection of the towing vehicle to the trailer hitch.

3 Claims, 3 Drawing Sheets

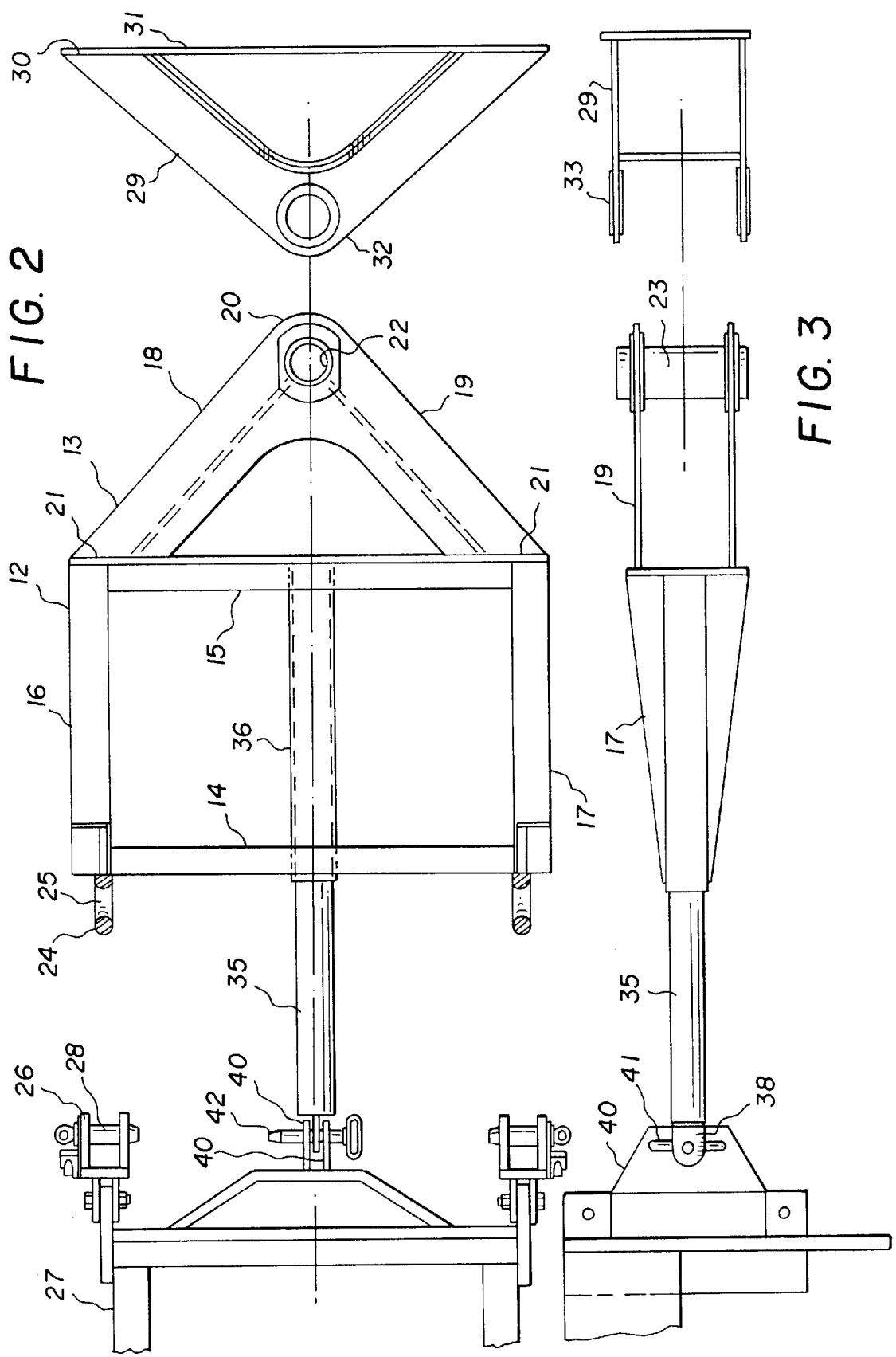

TRAILER HITCH WITH TELESCOPING GUIDE

FIELD OF THE INVENTION

The present invention relates to a trailer hitch construction for connecting a trailer to a towing vehicle, more particularly, to such a trailer hitch which is provided with both vertical and horizontal pivoting axes and which is further provided with a telescoping alignment bar to facilitate connection of the towing vehicle with the trailer hitch.

DESCRIPTION OF RELATED ART

Trailer hitches generally comprise a single draw bar which may extend either from a towing vehicle or the trailer and the free or extending end of the tow bar is provided with a horizontally disposed opening or tow-ring which is connected to another vehicle by a coupler as known in the art or by means of a vertically disposed pin to a corresponding bracket on the other vehicle. One disadvantage of such a trailer hitch is that the trailer is susceptible to tilting or leaning, particularly when going around curves, because the connection afforded by the tow ring and coupler permits a considerable amount of play or movement from the vertical plane. Further, a considerable amount of stress is concentrated at this tow ring and this portion of the hitch is always susceptible to breaking during operation. In addition, the play between the tow ring, its coupler and the bracket results in a considerable amount of slack and this slack causes increased wear in the tow ring connection assembly. It is also difficult to connect the towing vehicle to the draw bar because it is necessary to back the vehicle into a precise position where the tow ring on the draw bar will be aligned precisely with the bracket or coupler on the towing vehicle to permit coupling. This problem of connecting with the trailer hitch becomes considerably magnified when large vehicles are involved such as with a tractor truck and a semi-trailer. Several forms of alignment or guiding devices have been proposed to facilitate the connection of the bracket on the towing vehicle with the tow ring on the draw bar. However, such alignment devices have not been particularly satisfactory since they are invariably complicated in structure and considerable care must be exercised in positioning these guide devices. Thus, known alignment devices do not provide easy and convenient connections between the towing vehicle and the trailer hitch.

BRIEF SUMMARY OF THE INVENTION

It is the principal object of the present invention to provide a novel and improved trailer hitch construction for connecting a trailer to a towing vehicle.

It is another object of the present invention to provide such a trailer hitch connection which incorporates an alignment or guide mechanism which facilitates connection of the tow vehicle to the trailer hitch.

It is a further object of the present invention to provide such a trailer hitch connection which has increased stability so as to reduce and control lean or tilting of the vehicle particularly around curves or turns.

It is a further object of the present invention to provide such a trailer hitch which has a high degree of safety, provides a tighter turning radius of the towing vehicle and trailer, virtually eliminates slack or play in the hitch and pivot mechanism.

The objects of the present invention are achieved and the disadvantages of the prior art are overcome by the detachable trailer hitch disclosed herein which may comprise a horizontally disposed rigid frame at one end of which is a vertical axis connection to a trailer and at the other end of which is a double horizontal axis connection to the towing vehicle. A telescoping alignment bar is mounted on the frame and has an extendable end which is engagable between a pair of spaced bars on the towing vehicle to provide alignment.

According to one aspect of the present invention the trailer hitch may comprise a horizontally disposed rigid frame which has a rectangular portion attached to the base of a triangular portion. The apex of the triangular portion provides for a pivotal connection about a vertical axis and the opposite end of the rectangular frame provides for a double pivotal connection about a horizontal axis. The telescopic alignment bar is slidably received in a hollow cylinder which is mounted on the rectangular portion of the frame. The alignment bar comprises the flattened outer end having a horizontally disposed opening there through which is engagable with a pair of spaced bars on the towing vehicle. Once this alignment bar has been connected to the vehicle, the vehicle is then backed toward the trailer hitch into the correct position for engaging the eyebolt pivotal connections on the end of the rigid frame.

BRIEF DESCRIPTION OF THE DRAWINGS

Other objects and advantages of the present invention will be apparent upon reference to the accompanying description when taken in conjunction with the following drawings, which are exemplary, wherein;

FIG. 2 is a top plan view of the trailer hitch of FIG. 1 showing the alignment bar in the extended position and connected to the towing vehicle and showing the other end of the hitch spaced from the connection on the trailer vehicle;

FIG. 3 is a side elevational view of the trailer hitch construction as shown in FIG. 2;

DETAILED DESCRIPTION OF THE INVENTION

Proceeding next to the drawings wherein like reference symbols indicate the same marks throughout the various views, a specific embodiment and modifications of the present inventions will be described in detail.

Figure 1:
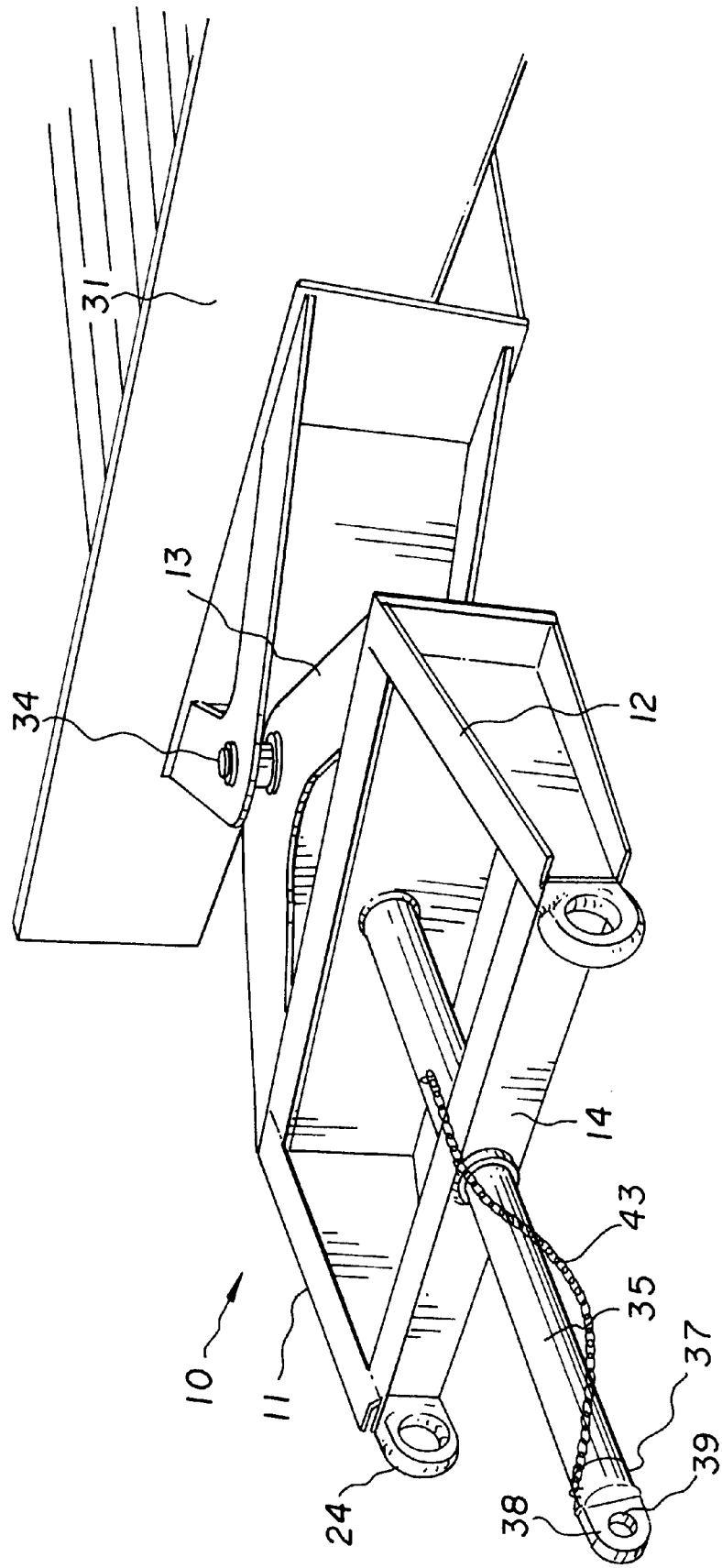
FIG. 1 is a perspective view of the trailer hitch according to the present invention with the telescoping alignment bar being shown in the extended position.
Figures 4, 5:
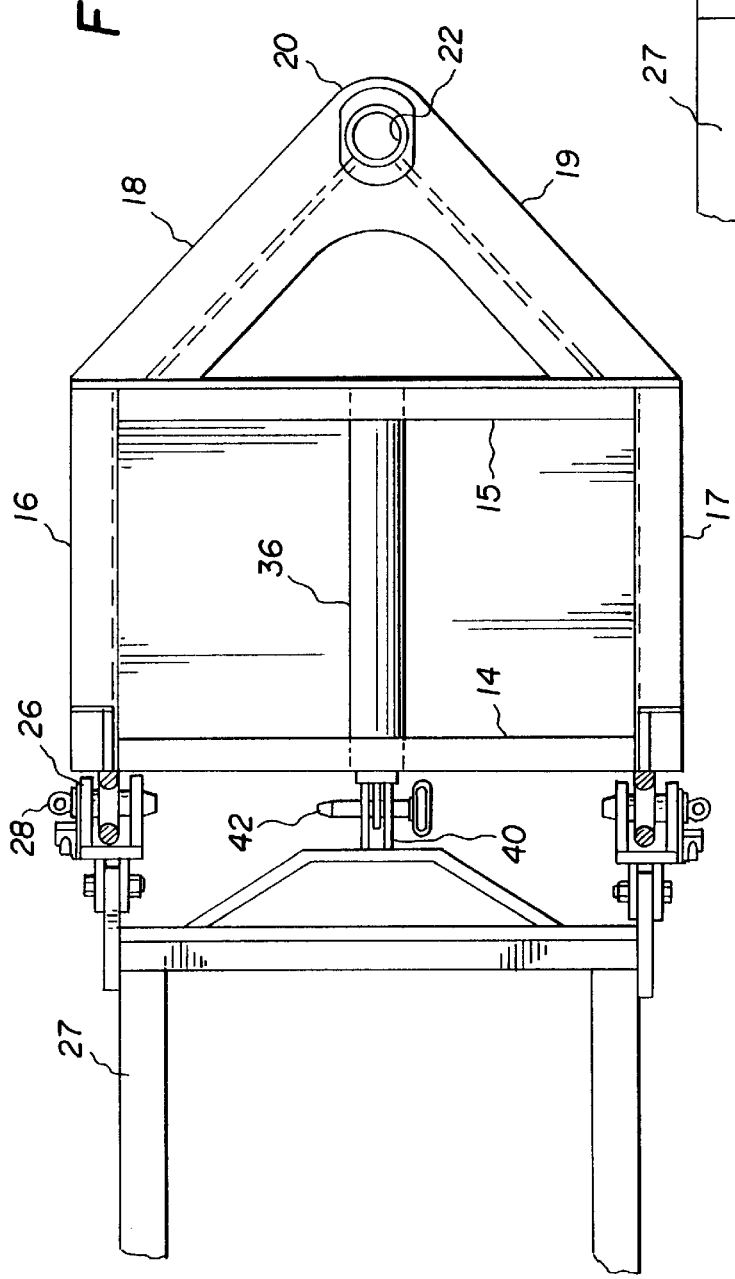
FIG. 4 is a top plan view of the trailer hitch showing the alignment bar in the retracted position and both ends of the trailer hitch connected to the towing vehicle.
FIG. 5 is a side elevational view of the bracket connection on the towing vehicle.

As may be seen in FIG. 1, the trailer hitch, according to the present invention, is indicated generally at 10 and comprises a rigid frame 11 which is normally disposed in a horizontal position as shown and this rigid frame comprises a rectangular frame portion 12 and a triangular frame portion 13 both of which may be more clearly seen in FIGS. 2 and 4. The rectangular frame portion 12 comprises a pair of opposed parallel sides 14 and 15 interconnected at their ends by parallel opposed end members 16 and 17. These members constituting the frame are formed of suitably shaped structural steel members which in the present embodiment are channel members.

The triangular frame portion 13 is formed of two leg members 18 and 19 converging at an apex 20 and the other ends of the legs 21 define a base which is attached to the forward portion of the side member 15. The apex 20 is provided with a vertically disposed opening 22 formed by a cylindrical steel member 23 welded in position between the top and bottom portions of the triangular frame as may be more clearly shown in FIG. 3.

Extending rearwardly from the ends of the side member 14 is a pair of legs 24 each having a horizontal opening 25 there through so as to define a lug. The legs 24 are positioned to be received within U-shaped or bifurcated brackets 26 projecting outwardly from the rear end of a towing vehicle or truck 27. Each of the brackets 26 has horizontal openings there through to receive a pin 28 such that when a leg 24 is positioned within the bracket 26, the pin 28 is inserted to pass through the opening 25 in the leg to secure the rigid frame to the vehicle in a manner as shown in FIG. 4. The rigid frame is thus free to pivot about a horizontal axis defined by the pins 28.

The other end of the rigid frame 11 represented by the triangular frame portion 13 is attached to a similarly shaped triangular member having ends 30 which are fixedly and permanently attached to a trailer vehicle represented at 31. The legs 29 intersect to define an apex 32 having a pair of vertically spaced openings 33 therein to receive the cylinder 23 of the triangular frame member and a pin 34 the top of which may be seen in FIG. 1 passes through the openings 33 at cylinder 23 to secure the rigid frame member to the trailer. This connection to the trailer is pivotable such that the rigid frame can pivot vertically about the axis defined by pin 34.

In this embodiment of the invention the side member 15 is wider than the side member 14 as may be seen in FIG. 3 and the end members 16 and 17 connecting the side members 14 and 15 are tapering as also may be seen in FIG. 3.

In order to facilitate connection of the towing vehicle 27 with the trailer hitch end, a convenient and simple aligning structure is provided which comprises a telescoping alignment bar 35 which is slidably received within a cylinder 36 mounted between the side members 14 and 15 of the rigid frame. The end of the cylinder 36 actually passes through an opening in the side member 14 to project only slightly beyond the side member in the manner as shown in FIG. 2. Since the side member 14 is a channel member the cylinder passes through the web of the channel. On the outer end 37 of the alignment bar 35 there is provided a flattened portion 38 having a horizontally disposed opening 39 there through to form a lug. This flattened end 38 is guided between a pair of spaced plates 40 mounted on the rear end of the vehicle 27 in a manner as may be seen in FIG. 4 and these plates are each provided with a vertical slot 41 to receive a pin 42 which will pass through the opening 39 of the alignment bar to secure the alignment bar in position as shown in FIG. 2. The pin 42 also forms a horizontal pivoting axis for the hitch 10 and this axis is aligned with the pins 28.

In order to connect the towing vehicle with the trailer hitch according to the present invention, the alignment bar 35 is moved outwardly to its extended position as shown in FIG. 1 by maneuvering of the towing vehicle in the backing position and by appropriate lateral movements of the alignment bar 39, the flattened end 38 of the alignment bar will be guided into the alignment plates or bracket 40 in the manner as shown in FIG. 2. The pin 42 is then inserted to lock the alignment bar in position and subsequent backing of the vehicle will automatically cause the lugs 24 on the trailer hitch to engage into the pairs of U-shaped brackets 26 on the rear of the towing vehicle. The pins 28 are then inserted into the brackets through the lugs 24 and the trailer hitch is now connected to the vehicle in the manner as shown in FIG. 4. The alignment bar 35 is now in its retracted position. A chain 43 may be provided as shown in FIG. 1 to limit the extended movement of the alignment bar.

When the trailer hitch is in its connected position as shown in FIG. 2, the hitch can pivot about a horizontal axis with respect to the towing vehicle and the hitch is also capable of pivoting movement about a vertical axis defined by the pin 34 connecting the hitch to the trailer. It has been found that the use of the double horizontal connection between the trailer hitch and the towing vehicle provides significantly greater stability of the trailer with respect to the towing vehicle and virtually eliminates any tilting or leaning of the trailer around curves or turns. Further, the single pin vertical axis connection between the trailer hitch and the trailer permits a pivoting of the trailer hitch of up to 75 degrees which in turn significantly increases the maneuverability of the tractor-trailer combination since a tighter turning radius is provided.

It is further pointed out that the pivoting portions of the hitch are provided with bearing surfaces unlike conventional hitches which simply have metal to metal contact which promotes wear. As a result of these bearing connections, slack in the hitch and pivot mechanism is virtually eliminated.

Thus it can be seen that the present invention provides a trailer hitch which is simple in construction yet provides a secure and safe hitch between a towing vehicle and a trailer.

It will be understood that this invention is susceptible to modification in order to adapt it to different usages and conditions, and accordingly, it is desired to comprehend such modifications within this invention as may fall within the scope of the appended claims.

What is claimed is:

1. A trailer hitch comprising a horizontally disposed rigid frame comprising a rectangular frame portion having first and second parallel opposed side members and first and second parallel opposed end members interconnected at their ends to the ends of said side members and a triangular frame portion comprising first and second leg members extending from the ends of the first side of said rectangular frame portion and converging to define an apex opposite from said first side, first means on said second side of said rectangular frame portion for pivotally connecting to a horizontal axis and second means on said apex of said triangular frame portion for pivotally connecting to a vertical axis such that the trailer hitch has only said horizontal and vertical pivoting axes.

2. A trailer hitch comprising a horizontally disposed rigid frame portion having first and second parallel opposed sides and a triangular frame portion having a base attached to the first side of said rectangular frame portion and further having an apex opposite said base, first means on said second side of said rectangular frame portion for pivotally connecting to a horizontal axis and second means on said apex of said triangular frame portion for pivotally connecting to a vertical axis, a telescoping alignment bar on said rectangular frame portion at the center portions of said first and second sides and having a first end directed outwardly of said rectangular frame portion, said first end of said alignment bar has a horizontal opening therethrough and is engageable between a pair of laterally spaced bars having aligned horizontal openings therethrough, said telescoping alignment bar comprises a cylindrical member slidably disposed in a hollow cylinder mounted on said rectangular frame portion, there being a pair of legs extending horizontally from the ends of said second side of said rectangular frame portion and having horizontally disposed openings there through, said alignment bar has retracted and extended positions such that in the retracted position, the horizontal opening in the flattened end portion is aligned with the horizontal openings in the legs.

3. A hitch connection between a towing vehicle and a trailer comprising a towing vehicle, a trailer vehicle, and a horizontally disposed rigid frame comprising a rectangular frame portion having first and second parallel opposed side members and first and second parallel opposed end members interconnected at their ends to the ends of said side members and a triangular frame portion having a base attached to the first side of said rectangular frame portion and further having an apex opposite said base, a pair of legs coextensive with said end members extending horizontally from the ends of said second side of said rectangular frame portion and said legs each having a horizontal opening there through to define eyebolts, a pair of U-shaped brackets having openings there through extending rearwardly from a towing vehicle such that said eyebolts are each received within the pair of U-shaped brackets and a connecting pin passing through the registered openings of said eyebolt and bracket, there being a vertically extending opening through the first apex of said first triangular frame portion, and a second triangular frame portion having a base attached to a trailer vehicle and further having a second apex, there being a pair of vertically aligned openings through said second apex registering with the vertical opening through said first apex and receiving a connecting pin there through to define a pivotal connection.

* * * * *